Jan. 21, 1969  G. H. REES  3,422,709

SELF-CENTERING TAIL STOCK ASSEMBLY

Filed July 20, 1966

G. HERBERT REES
INVENTOR

BY
ATTORNEY

United States Patent Office 3,422,709
Patented Jan. 21, 1969

3,422,709
SELF-CENTERING TAIL STOCK ASSEMBLY
G. Herbert Rees, 105 Mystic St., Arlington, Mass. 02174
Filed July 20, 1966, Ser. No. 566,597
U.S. Cl. 82—33     7 Claims
Int. Cl. B23b 23/02

ABSTRACT OF THE DISCLOSURE

A nonrotating, self-centering tail stock assembly for supporting a work piece to be machined while the work is rotating. The assembly is provided with a plurality of adjustable nonrotating jaw centering pieces one end of which bears against a fixed jaw operator and which extends through a body member. The other ends of each of the jaw centering pieces define an aperture within which the work piece may rotate and be supported.

---

Figure 1:
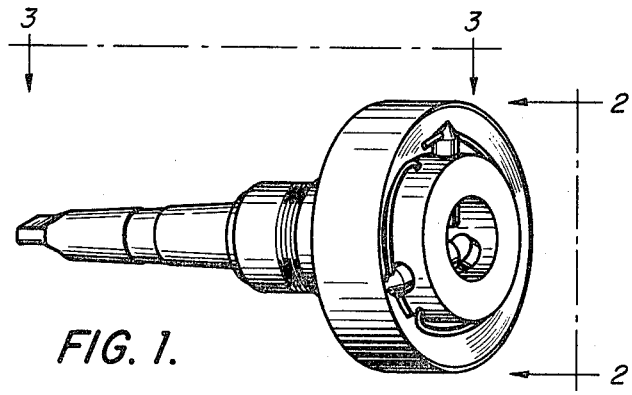

This invention relates to machine tool devices and, more particularly, to a self-centering tail stock assembly having particular utility in a lathe.

In the machining art, it is frequently necessary to machine a piece of metal in a lathe wherein the dictated requirements are such that the finished article neither shows nor includes the center holes at the ends thereof. In certain machining operations, before my invention, these center holes were considered indispensable.

In the past, when the lathe operator or machinist was faced with the problem of producing an article without center holes in the finished product, he found that the easiest method to accomplish this result would be to machine the piece from a length of stock that was considerably longer than would normally be required for the finished product. The excess material at the end (or ends) is referred to as the dummy ends(s). It is this dummy end that included the center hole to be used in conjunction with a live or dead center during the machining operation. To complete the machiining operation, the dummy end is then excised to bring the piece within the required specification limits.

It, thus, becomes obvious that, when a dummy end is required at either or both ends of a piece, there will be an increased expense because of the wasted material and the added operation of removing the dummy end.

My device obviates the need for either a live or dead center on the lathe and the attendant center holes on the piece being machined. With the removal of the need for a dummy end, I can thereby decrease the surplus material that must be included and thereafter discarded. In addition, I am also able to avoid the additional machining operation required to excise the dummy end and, thereby, reduce the cost of manufacturing the machined piece.

It is, therefore, a principal object of the subject invention to provide a self-centering tail stock assembly.

Another principal object of the subject invention is to provide a self-centering tail stock assembly that avoids the need for the use of a live center in a machining operation.

Still another principal object of the subject invention is to provide a self-centering tail stock assembly that avoids the need for the use of a dead center in a machining operation.

Yet another principal object of the subject invention is to provide a self-centering tail stock assembly, the use of which results in the need for less material to produce a machined article.

A further principal object of the subject invention is to provide a self-centering tail stock assembly which reduces the number of operations required to produce a machined article.

A still further principal object of the subject invention is to provide a self-centering tail stock assembly, the use of which results in lower manufacturing costs.

Figure 2:
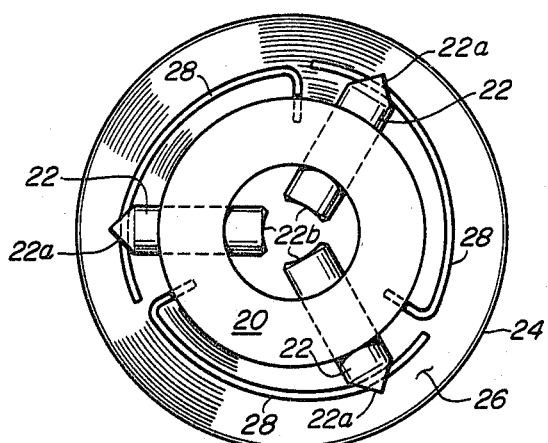
Figure 3:
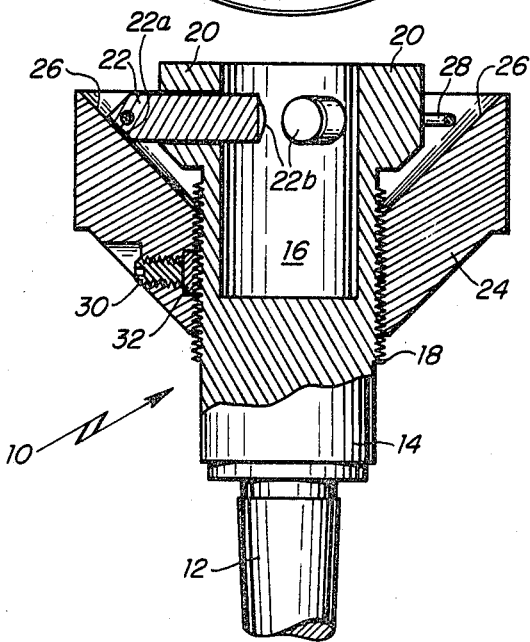

The features of my invention which I believe to be novel are set forth with particularity in the appended claims. My invention itself, however, both as to its organization and method of operation, together with further objects and advantages thereof, may be best understood by reference to the following description taken in conjunction with the accompanying drawings in which:

FIG. 1 is a perspective view of my device;
FIG. 2 is a plan view of my device taken along lines 2—2 of FIG. 1; and
FIG. 3 is a sectional view taken along lines 3—3 of FIG. 1.

Referring now to the drawings, there is shown a self-centering tail stock assembly 10 provided with a body 14 that has a spindle 12 attached at one end thereof so that the entire assembly 10 may be held by the tail stock of the lathe. Body 14 is further provided with a central bore 16 and a threaded portion 18, both of which extend along a major portion of body 14, along the axis thereof. The other end of body 14 has a flange portion 20 with centering pieces 22 disposed perpendicularly to the axis of the bore and in the same plane thereof.

A jaw operator 24 is provided having a tapered conical portion 26 having the same taper as, and cooperating with, ends 22a of the centering pieces 22. Conical surface 26 terminates in a threaded bore having the same thread therein as the outer portion thread 18 of body 14. The other ends of centering pieces 22 are shown with curved surfaces 22b to accommodate the rotating piece as will be hereinafter explained. Centering pieces 22 are further provided with spring loading means 28 to constantly urge the centering pieces against surface 26 irrespective of the position of jaw operator 24 along threads 18.

Thus, when using my novel centering device, it is merely necessary to insert spindle 12 into the tail stock of the lathe and rotate jaw operator 24 until surfaces 22b of centering pieces 22 just touch and support the article to be machined. Rotation of jaw operator 24 so that it is threaded towards flange 20 decreases the opening formed between ends 22b, while rotating jaw operator 24 so that it is threaded toward spindle 12 increases the opening to accommodate a large variety of sizes.

By providing a low-friction surface (22b) so that the work piece can freely rotate therein, it will be seen that with my device, as hereinbefore described, the work piece will also be centrally located or positioned relative to both the axis of the tail stock spindle and the spindle of the head stock. Similarly, it will no longer be necessary to provide a center hole in the work piece as is customary when a center point, either live or dead, is used with the work.

It will be readily seen, by those skilled in the art, that while I depict surfaces 22b as being curved, there will be many instances where it may be advantageous to have the inner end terminate in a cone. Similarly, it should be understood that, if necessary, all or some of the centering pieces may be fitted with oiling devices to lubricate the work piece as it rotates.

While the body member 14 is shown provided with a threaded portion 18 and jaw operator 24 is shown with a threaded bore portion for mating with the threaded portion 18, both threaded portions cooperating to provide a fine adjustment of the opening between ends 22b, it will be obvious to those skilled in the art that, instead of the threaded portions, body member 18 and jaw operator 24 may be provided with any one of the many cooperating key-type arrangements to prevent rotation yet still provide a means of longitudinal adjustment of jaw operator 24 along the length of body 14. In both instances, it would be well to provide set screw means 30 to prevent lateral or rotational motion. In the situation where a thread is provided, pad 32, preferably a soft metal, may be inserted between set screw 30 and threaded portion 18 to prevent the threaded portion from being crushed.

While I have described what is presently considered the preferred embodiment of my invention, it will be obvious to those skilled in the art that various changes and modifications may be made therein without departing from the inventive concept, and it is aimed in the appended claims to cover all such changes and modifications as fall within the true spirit and scope of my invention.

I claim:
1. A nonrotating, self-centering tail stock assembly for rotatably supporting a work piece, comprising:
   a nonrotating, substantially hollow, elongate body member having a central axis extending along the length thereof and having an open end portion and a closed end portion;
   mounting means affixed to the body member at the closed end portion thereof and providing means for rigidly mounting the assembly in a holder;
   a jaw operator having a central bore for engagement with the outer perimeter of the hollow body member and having a tapered, conical surface concentric with and extending along the bore; and
   a plurality of nonrotating, jaw centering pieces adjustably mounted on and extending through and into the open end portion of the body member and disposed at right angles with respect to the central axis, one end of each centering piece bearing against the tapered, conical surface of the jaw operator, the other end of each centering piece defining an aperture within which the work piece is rotatably supported.
2. The tail stock assembly of claim 1 further comprising:
   means for positioning the jaw operator along the length of the body member to vary the opening of the aperture formed by the other ends of the centering pieces.
3. The tail stock assembly of claim 2 further comprising:
   set screw means extending through the jaw operator to the body member to maintain the jaw operator in a fixed position along the length of the body member.
4. The tail stock assembly of claim 3 wherein the means positioning the jaw operator comprises:
   a threaded portion extending along the outer perimeter of the body member; and
   a similarly threaded portion extending along the length of the bore of the jaw operator to mate with the threaded portion on the body member.
5. The tail stock assembly of claim 4 wherein:
   the open portion of the body member is provided with a flange portion perpendicular to and disposed about the central axis of the body member; and
   the centering pieces extend through the flange portion and are symmetrically disposed about the central axis.
6. The tail stock assembly of claim 5 further comprising:
   an equal plurality of spring means associated with each of the centering pieces, constantly urging each centering piece against the conical surface of the jaw operator in any position thereof along the length of the body member.
7. The tail stock assembly of claim 6 wherein the mounting means is a spindle extending along the central axis of the body means.

References Cited
UNITED STATES PATENTS 2,496,545    2/1950    Kraemer _____ 82—33
2,555,419    6/1951    Reaves et al. _____ 82—33 XR LEONIDAS VLACHOS, Primary Examiner.

U.S. Cl. X.R.

82—45; 279—16